United States Patent
*Sugita

Patent Number: 5,878,689
Date of Patent: Mar. 9, 1999

[54] POINTER FOR MEASURING INSTRUMENTS

[75] Inventor: Masaya Sugita, Susono, Japan

[73] Assignee: Yazaki Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 531,654

[22] Filed: Sep. 21, 1995

[30] Foreign Application Priority Data

Sep. 26, 1994 [JP] Japan .................................. 6-229519

[51] Int. Cl.$^6$ .............................. G01D 11/28; F21S 3/00
[52] U.S. Cl. ............................ 116/286; 116/288; 362/23; 362/84
[58] Field of Search ................................... 116/62.1, 286, 116/288, 328, 332, DIG. 35; 362/23, 84; 313/512

[56] References Cited

U.S. PATENT DOCUMENTS

| 3,089,973 | 5/1963 | Herold et al. .............................. 362/84 |
| 3,109,959 | 11/1963 | Delachapelle et al. .......... 116/DIG. 35 |
| 3,219,008 | 11/1965 | Harris et al. . |
| 3,243,629 | 3/1966 | Levetan . |
| 3,295,002 | 12/1966 | Amans . |
| 3,378,715 | 4/1968 | Thornton . |
| 3,868,756 | 3/1975 | Zumbach . |
| 4,104,555 | 8/1978 | Fleming . |
| 4,357,557 | 11/1982 | Inohara et al. . |
| 4,708,914 | 11/1987 | Kamijo . |
| 4,839,558 | 6/1989 | Mierzwinski . |
| 4,882,517 | 11/1989 | Maruyama et al. . |
| 5,050,045 | 9/1991 | Kato et al. ............................... 116/288 |
| 5,116,270 | 5/1992 | Aizawa et al. . |
| 5,372,087 | 12/1994 | Kato et al. ............................... 116/286 |
| 5,711,594 | 1/1998 | Hay .......................................... 362/84 |

FOREIGN PATENT DOCUMENTS 5-25317   4/1993   Japan .
5-81993  11/1993   Japan .

Primary Examiner—Diego Gutierrez
Assistant Examiner—Andrew Hirschfeld
Attorney, Agent, or Firm—Armstrong, Westerman, Hattori, McLeland & Naughton

[57] ABSTRACT

A pointer for measuring instruments includes a fixing portion mounted on a drive shaft of a drive and an indicating portion supported on the fixing portion and extending therefrom in a direction perpendicular to an axis of the drive shaft. The indicating portion includes an EL element having a light-emitting surface extending over a substantially entire length of the indicating portion in the direction perpendicular to the drive shaft axis, at the light-emitting surface light being substantially uniformly distributed at least in the direction perpendicular to the drive shaft axis; a light-transmitting protective body covering at least the light-emitting surface; and an indicating tube. The surface of the portion of the indicating tube confronting at least the above light-emitting surface is arcuated in a circumferential direction of the direction perpendicular to the drive shaft axis. The pointer for measuring instruments is three-dimensionally illuminated with entirely uniform brightness, of high practical utility and producible at a low cost.

13 Claims, 7 Drawing Sheets

POINTER FOR MEASURING INSTRUMENTS

BACKGROUND OF THE INVENTION

1. Field of the Invention

This invention relates to a pointer for measuring instruments, and more particularly to a light-emitting pointer for measuring instruments, which is used in conjunction with the dial plate of a measuring instrument for vehicles such as an automobile to indicate a measured value on the dial plate.

2. Description of the Related Art

Various vehicles such as an automobile and the like are generally installed with measuring instruments for indicating measured values such as velocities of the vehicles, engine torques and the like.

Of these, measuring instruments of analog type include a dial plate with graduations, letters and the like formed thereon, and a pointer that cooperates with such graduations, letters and the like to indicate measured values. In a number of analog instruments, the pointer is so constructed as to be self-illuminated to enable the measured value to be readily recognized even in the darkness.

Figure 11:
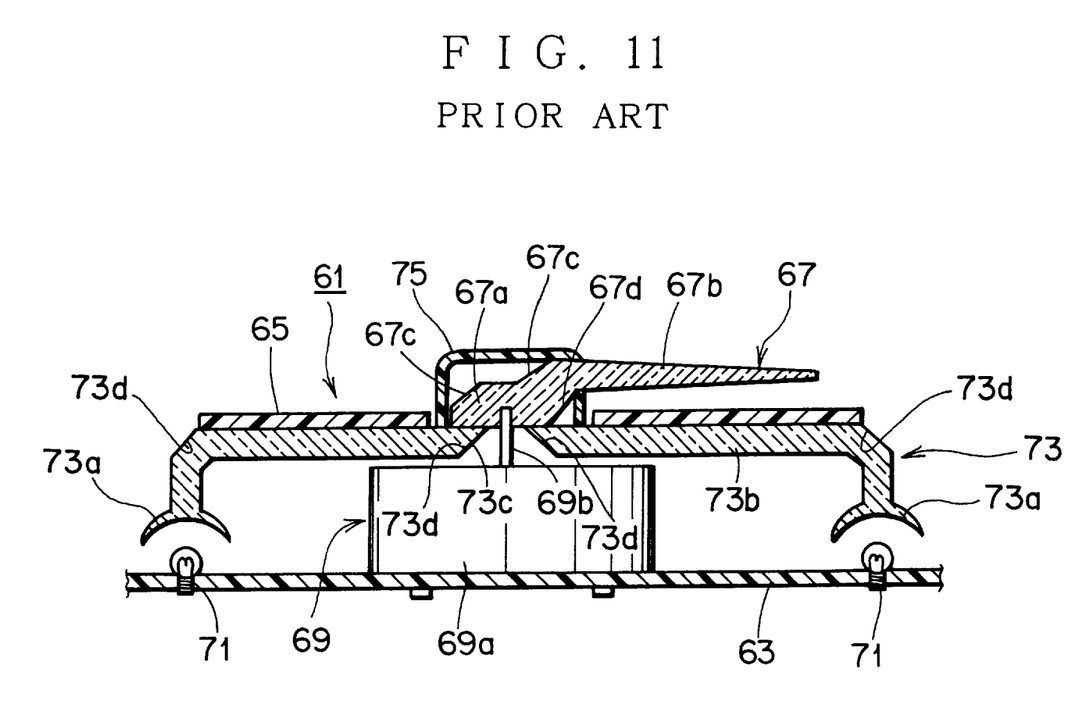
FIG. 11 is a sectional view showing the construction of an essential portion of a conventional measuring instrument for vehicles in which the pointer is self-illuminated.

FIG. 11 is a sectional view showing the construction of an essential portion of a conventional measuring instrument for vehicles with a self-illuminated pointer.

The measuring instrument generally designated at 61 in FIG. 11 includes a casing 63 comprising a printed substrate, a graduations, letters and the like-formed dial plate 65 disposed forwardly of the casing 63, a pointer 67, an internal 69 for rotary driving the pointer 67, sources of light 71 for illuminating the pointer 67, and a light-guiding plate 73 for guiding light from the sources of light 71 to the pointer 67.

The internal drive 69 comprises a main body 69a mounted on the casing 63 and having a coil (not shown) contained therein, and a drive shaft 69b protruding forwards from the main body 69a. The drive shaft 69b is circumferentially rotatably supported in the main body 69a and caused to rotate when the coil in the main body 69a is energized.

Each source of light 71 comprises, for example, an incandescent bulb and is supported on the casing 63 at a position spaced from the main body 69a of the internal drive 69.

The light-guiding plate 73 is formed from a synthetic resin material excellent in light transmission properties, e.g. transparent acrylic resin or the like and comprises light-receiving portions 73a located forwardly of the sources of light 71 and a light-guiding portion 73b extending from the respective light-receiving portions 73a over the main body 69a.

Each light-receiving portion 73a is of substantially hemispherical shape directed towards the source of light 71, a shaft hole 73c is formed at the area of the light-guiding portion 73b in front of the main body 69a, and the drive shaft 69b extends through the shaft hole 73c so that its front end is located forwardly of the light-guiding plate 73.

The light-guiding portion 73b has reflecting surfaces 73d formed at an inclination of substantially 45° at positions close to the light-receiving portions 73a and close to the shaft hole 73c.

The pointer 67, like the light-guiding plate 73, is formed from a synthetic resin material excellent in light transmission properties and comprises a substantially cylindrical fixing portion 67a fitted over the front end of the drive shaft 69b and a long flat indicating portion 67b extending from the fixing portion 67a, in a radial direction of the drive shaft 69b.

At the front of the fixing portion 67a are formed two reflecting surfaces 67c each at an inclination of substantially 45°. At the rear of the fixing portion 67a at a position substantially opposite one of the above reflecting surfaces 67c is formed a reflecting surface 67d at an inclination of substantially 45°. The fixing portion 67a is covered with a light-leakage prevention cap 75.

The rear surface of the indicating portion 67b facing the dial plate is colored, e.g. red with hot melt to prevent leakage of light to the side of the dial plate 65 and to improve the viewability of the indicating portion 67b as the sources of light 71 are turned off.

With the thus constructed conventional measuring instrument 61, the light from the light source 71 falls on the light-receiving portion 73a and into the light-guiding plate 73. The light is subjected to irregular reflections inside the light-guiding plate 73 and reflected at reflecting surfaces 73d to be guided to the area around the shaft hole 73c, and further falls on the rear surface of the fixing portion 67a and into the pointer 67.

The light having entered the pointer 67 is then reflected at reflecting surfaces 67c, 67d to be guided to the indicating portion 67b, wherein the light is irregularly reflected so that the light is emitted forwards from the front surface of the indicating portion 67b to illuminate the pointer 67.

However, the conventional measuring instrument 61, in which light is guided from the light sources 71 to illuminate the pointer 67 has two drawbacks as mentioned below.

First, to guide light from the light sources 71 to the inside of the indicating portion 67b, the light-guiding plate 73 and the pointer 67 must be subjected to complicated processing so that they are provided with shapes such as the reflecting surfaces 67c, 67d, 73d and the like, resulting in the cost increased.

Second, most of the light incident on the rear surface of the fixing portion 67a and into the pointer 67, and reflected at reflecting surfaces 67c, 67d, moves straight inside the pointer 67 to the tip of the indicating portion 67b without being irregularly reflected at the area of the indicating portion 67b closer to the light-guiding plate 73 (the area on the root side of the indicating portion 67b).

Consequently, the indicating portion 67b becomes stronger in brightness at an area of the indicating portion 67b farthest from the leakage prevention cap 75 than at the area of the indicating portion 67b which is closer to the leakage prevention cap 75, making it difficult to illuminate the entire indicating portion 67b with uniform brightness.

Such being the case, in recent years a light-emitting pointer has been proposed in which an electroluminescence element (hereinafter abbreviated as EL element) is used to constitute the indicating portion.

Figure 12:
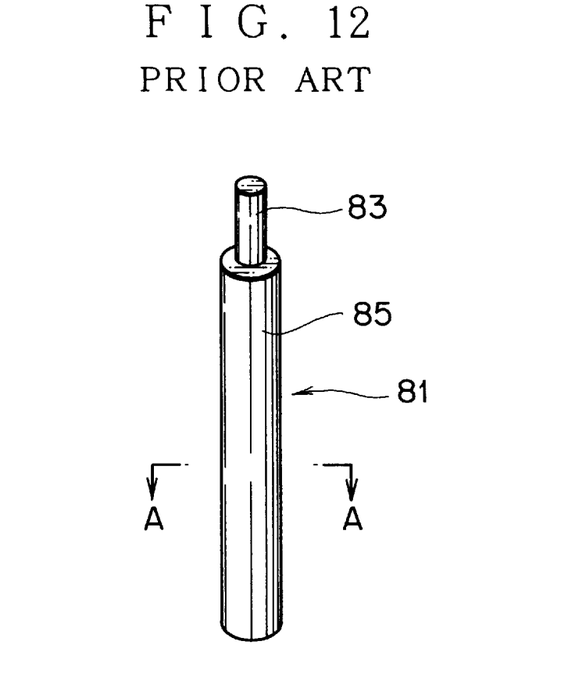
FIG. 12 is a perspective view of the indicating portion of a light-emitting pointer heretofore proposed.

FIG. 12 is a perspective view showing the indicating portion of a heretofore-proposed light-emitting pointer, in which designated at 81 is the indicating portion, 83 a core and 85 an EL element.

The core 83, which is of column shape, is formed from a conductive metal such as decarbonized steel, and the EL element 85 is concentrically formed around the core.

Figure 13:
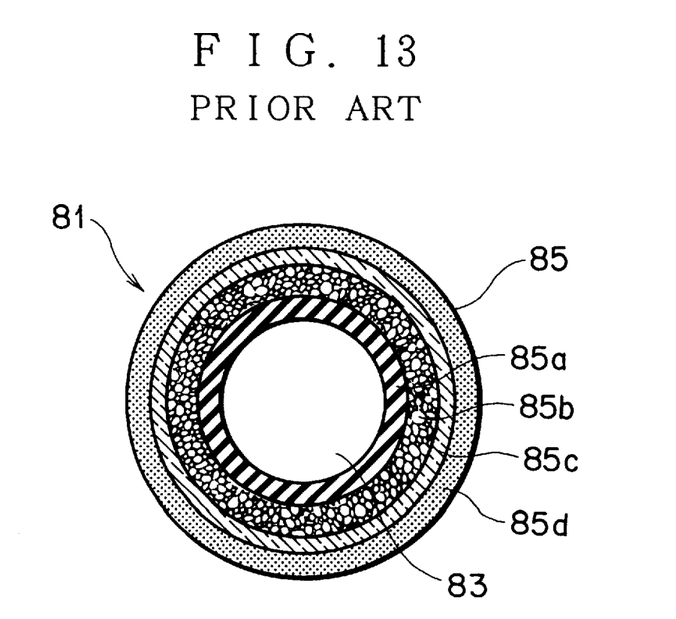
FIG. 13 is a sectional view of the indicating portion of FIG. 12 viewed in the direction of an arrow A.

As shown in FIG. 13, a section viewed in the direction of an arrow A in FIG. 12, the EL element 85 includes a circular insulating layer 85a, a fluorescent layer 85b, a transparent electrode film 85c and a light-transmitting, insulating protective layer 85d laminated in sequence around the outer periphery of the core 83 by a method such as dipping, calcination or the like.

The transparent electrode film 85c comprises, for example, an ITO (indium tin oxide) electrode, and in the indicating portion 81, the core 83 serves as one of the electrodes for the EL element 85 corresponding to the transparent electrode film 85c.

The indicating portion 81 is constructed so that, as a voltage is impressed between the core 83 and the transparent electrode film 85c, the fluorescent substance of the fluorescent layer 85b is excited to cause the entire fluorescent layer 85b to emit light at its surface, which light is then transmitted through the insulating protective layer 85d to be emitted outwardly of the indicating portion 81 so that the indicating portion 81 is as a whole illuminated.

The pointer of such construction has an advantage that, since the indicating portion 81 itself has a source of light that emits light at the surface with a uniform distribution of light, i.e., the EL element 85, the indicating portion 81 is entirely evenly illuminated with uniform brightness.

In addition, since in the pointer of such construction the surface of the indicating portion 81, i.e., the surface of the EL element 85 is arcuated circumferentially of the core 83, as compared with the pointer 67 in FIG. 11 having a flat indicating portion 67b that emits light only from its front surface, the indicating portion 81 is three-dimensionally recognized and makes an improvement in appearance and grade as well as in practical utility of the pointer.

With the pointer of the construction as shown in FIGS. 12 and 13, however, since the EL element 85 has an arcuate surface configuration, to laminate each layer of the EL element 85, a method such as dipping, calcination or the like must be employed which is costly as compared with printing commonly used in the formation of a sheet-like EL panel. As a result, it has been impossible to realize a reduction in the cost for the part.

SUMMARY OF THE INVENTION

This invention has been accomplished to overcome the above drawbacks and one of its objects is to provide a pointer for measuring instruments which is three-dimensionally illuminated with entirely uniform brightness, of high practical utility and producible at a low cost.

In order to attain the object, according to this invention, there is provided a pointer for measuring instruments comprising: a fixing portion mounted on a rotary drive shaft of a drive; and an indicating portion supported on the fixing portion and extending therefrom in a direction perpendicular to an axis of the rotary drive shaft, wherein the indicating portion comprises: a light-emitting body having a light-emitting surface extending over a substantially entire length of the indicating portion in the direction perpendicular to the axis of the rotary drive shaft, at the light-emitting surface light being substantially uniformly distributed at least in the direction perpendicular to the axis of the rotary drive shaft; and a light-transmitting protective body covering at least the light-emitting surface, a portion of the protective body confronting at least the light-emitting surface having a surface arcuated in a circumferential direction of the direction perpendicular to the axis of the rotary drive shaft.

With the pointer according to this invention, since the light emitted from the light-emitting body is uniformly distributed at least in the direction perpendicular to the drive shaft axis, i.e., in the direction in which the indicating portion extends, the indicating portion is illuminated with uniform brightness over its entirety in the direction of extension of the indication portion, by the light passed through the protective body and emitted to the outside of the indicating portion.

Further, since the surface of the area of the protective body confronting the light-emitting surface of the light-emitting body is arcuated in a circumferential diection of the drive shaft axis, if the light-emitting surface of the light-emitting body is of flat configuration, as the light from the light-emitting body passes through the protective body to the outside, the above-mentioned surface of the protective body is arcuately illuminated to cause the indicating portion to be three-dimensionally recongized, thereby improving the practical utility of the pointer.

In addition, since the light-emitting body may have a flat light-emitting surface, where for example the EL element is used as the light-emitting body, each layer of the EL element may be laminated by an inexpensive method of printing, making it possible to produce pointers at a low cost.

The above and other objects, features and advantages of this invention will become apparent from the following description and the appended claims, taken in conjunction with the accompanying drawings.

DESCRIPTION OF THE PREFERRED EMBODIMENT

A pointer for measuring instruments according to the first embodiment of this invention will now be described with reference to FIGS. 1 to 6.

Figure 1:
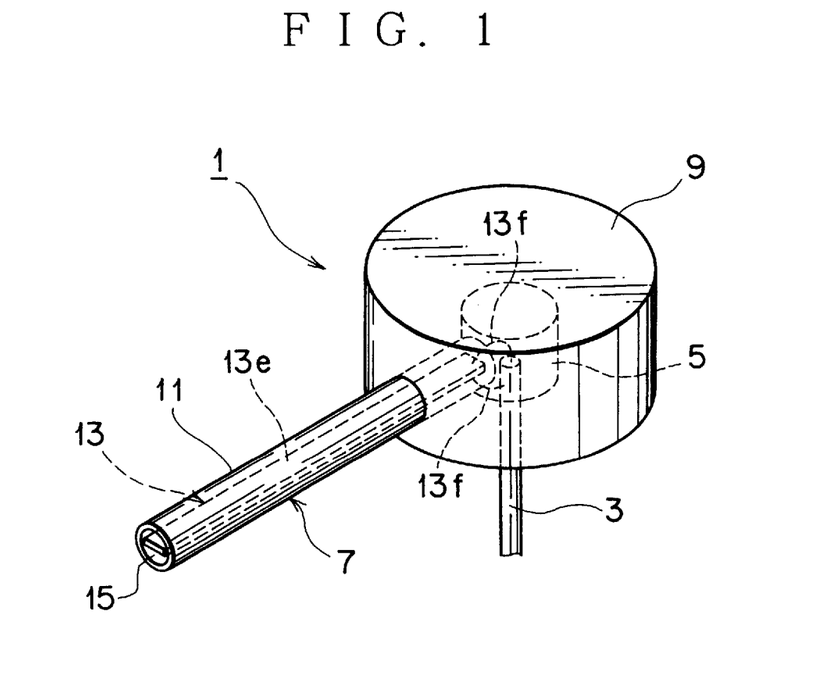
FIG. 1 is a perspective view of a pointer for measuring instruments according to a first embodiment of this invention.

A pointer generally designated at 1 in FIG. 1 comprises a fixing portion 5 fitted over a rotary drive shaft 3 of an internal drive (not shown), an indicating portion 7 protruding from the fixing portion 5 in a radial direction of the drive shaft 3, and a cap 9 covering the fixing portion 5.

The indicating portion 7 comprises a substantially cylindrical indicating tube 11 of transparent resin, an EL element 13 of substantially the same length as the indicating tube 11, of such size as to be accommodated inside the indicating tube 11 and rectangular on top view, and encapsulating material 15 filled up in the indicating tube 11 to encapsulate the EL element 13 inside the indicating tube 11. A protective body is thus constituted by the indicating tube 11 and the encapsulating material 15 in this embodiment.

Figure 2:
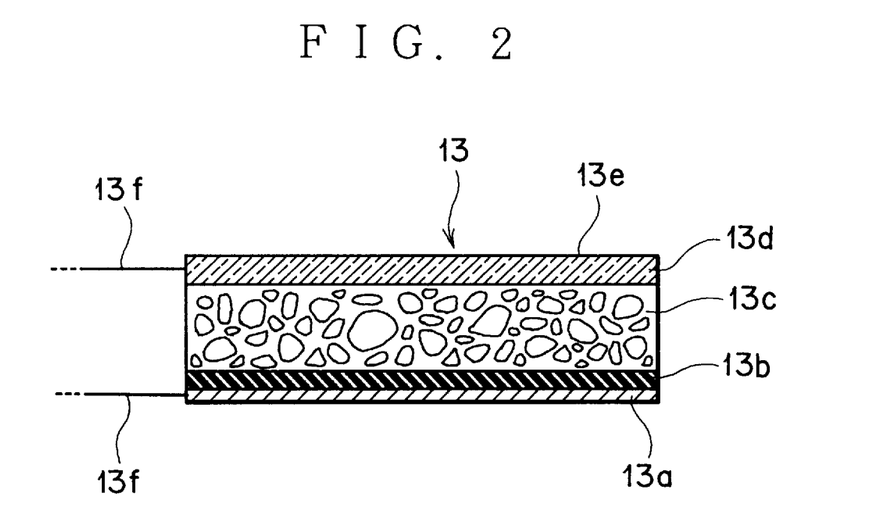
FIG. 2 is a side view of a light emitting body of the pointer of FIG. 1.

The EL element 13, as shown in FIG. 2, comprises an electrically conductive metal electrode 13a such as an aluminum plate or the like, and an insulating layer 13b, a fluorescent layer 13c and a transparent electrode film 13d laminated in sequence on the metal electrode 13a by a conventionally known method such as a printing process.

The EL element 13 has a surface on the side of the transparent electrode film 13d formed into a light-emitting surface 13e. A lead 13f is connected to each of the metal electrode 13a and the transparent electrode film 13d, as shown in FIGS. 1 and 2.

The EL element 13 is constructed so that, as a voltage is impressed between both electrodes 13a and 13d through the leads 13f, the fluorescent substance of the fluorescent layer 13c is excited to cause light to be emitted from the fluorescent layer 13c with a uniform distribution of light over the entire light-emitting surface 13e.

As the encapsulating material 15, thermoplastics material such as acrylic resin or polycarbonate resin, or synthetic resin material excellent in light transmission properties such as an acrylic or epoxy ultraviolet-curing adhesive or the like is used.

Figure 3:
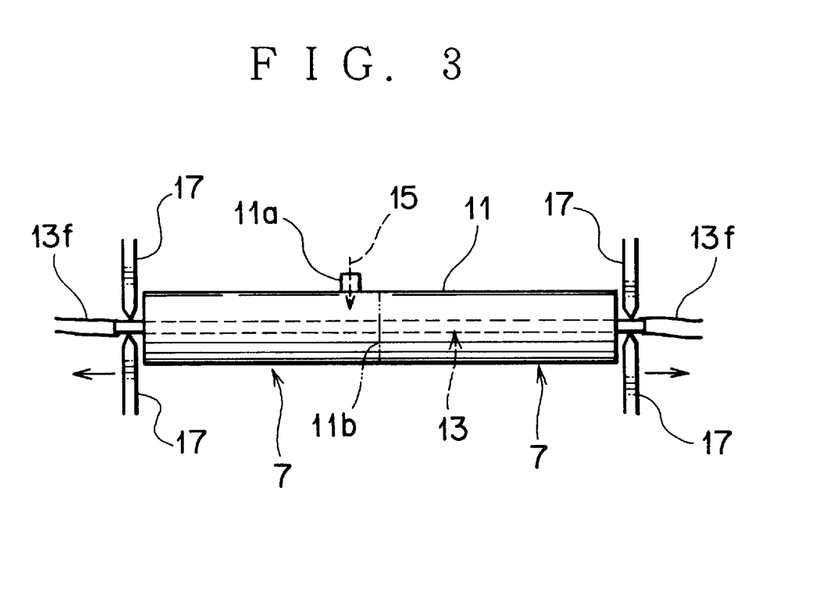
FIG. 3 is an explanatory view showing the process for producing the indicating portion in the case where thermoplastic resin is used for encapsulation material.

The pointer 7 is formed as follows.

Where thermoplastic resin is used as the encapsulating material 15, as shown in FIG. 3, an indicating tube 11 and an EL element 13 are first formed, each with length twice as long as the finished one. A lead 13f is attached at each of the longitudinally opposite ends of the EL element 13.

The indicating tube 11 is then horizontally held and fixed by not-shown holding means, followed by insertion of the EL element 13 through the indicating tube 11 so that the leads 13f are pulled out of both ends of the indicating tube 11. The pulled-out leads 13f are each held between clamps 17, followed by moving the clamps 17 in opposite directions so that the EL element 13 is under tension to substantially coincide with the center axis of the indicating tube 11.

Then, with both ends of the indicating tube 11 closed, the encapsulating material 15 is injected, by known injection molding, into the interior of the indicating tube 11 through an injection tap 11a provided on a peripheral portion of the indicating tube 11. After the injection tap 11a is removed, the remaining hole is blocked, and the encapsulating material 15 inside the indicating tube 11 is allowed to set.

Thereafter, the indicating tube 11 is on the outer periphery coated with a light-diffusing paint (not shown) of white color or the like for enhancing its viewability under the conditions where it is not illuminated. The indicating tube 11 is cut into halves at an imaginary intermediate line 11b in FIG. 3 to provide two finished indicating portions 7.

Figure 4:
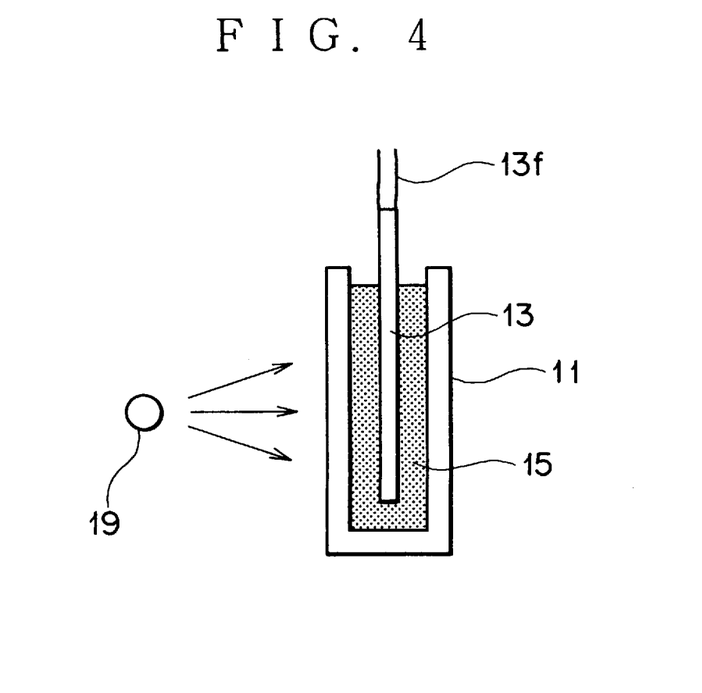
FIG. 4 is an explanatory view showing the process for producing the indicating portion in the case where a low-viscosity photo-setting resin is used for the encapsulation material.

It is preferred that the injection tap 11a be provided at the side of the indicating tube 11 opposite the side facing the light-emitting surface 13e of the EL element 13.

Where a low-viscosity photo-setting resin such as a low-viscosity ultraviolet-curing adhesive or the like is used as the encapsulating material 15, the indicating tube 11 is closed at one end and set upright with the closed end located downwards as shown in FIG. 4.

With one longitudinal end of the EL element 13 where the lead 13f is attached held upwards, the EL element 13 is inserted into the indicating tube 11 to substantially coincide with the center axis of the indicating tube 11. Then, with the lead 13f located out of the indicating tube 11, the encapsulating material 15 is injected into the indicating tube 11 through the open end located upwards.

After completion of the injection of the encapsulating material 15 into the indicating tube 11, the encapsulating material 15 is irradiated and cured with light (e.g. ultraviolet light) from a light source 19 located outside the indicating tube 11, followed by coating the outer periphery of the indicating tube 11 with the above-mentioned light-diffusing paint to provide the indicating portion 7.

The thus obtained pointer 7 is at the end on the side where the lead 13f is pulled out supported at the fixing portion 5, with the lead 13f extending into the inside of the fixing portion 5, as shown in FIG. 1.

The above-mentioned light-diffusing paint may be coated on an inner periphery of the indicating tube 11 prior to the injection of the encapsulating material 15. Alternatively, where thermoplastic resin is used as the encapsulating material 15, instead of coating the light-diffusing paint on the indicating tube 11, the indicating tube 11 may be formed from synthetic resin material including the light-diffusing paint.

Figure 5:
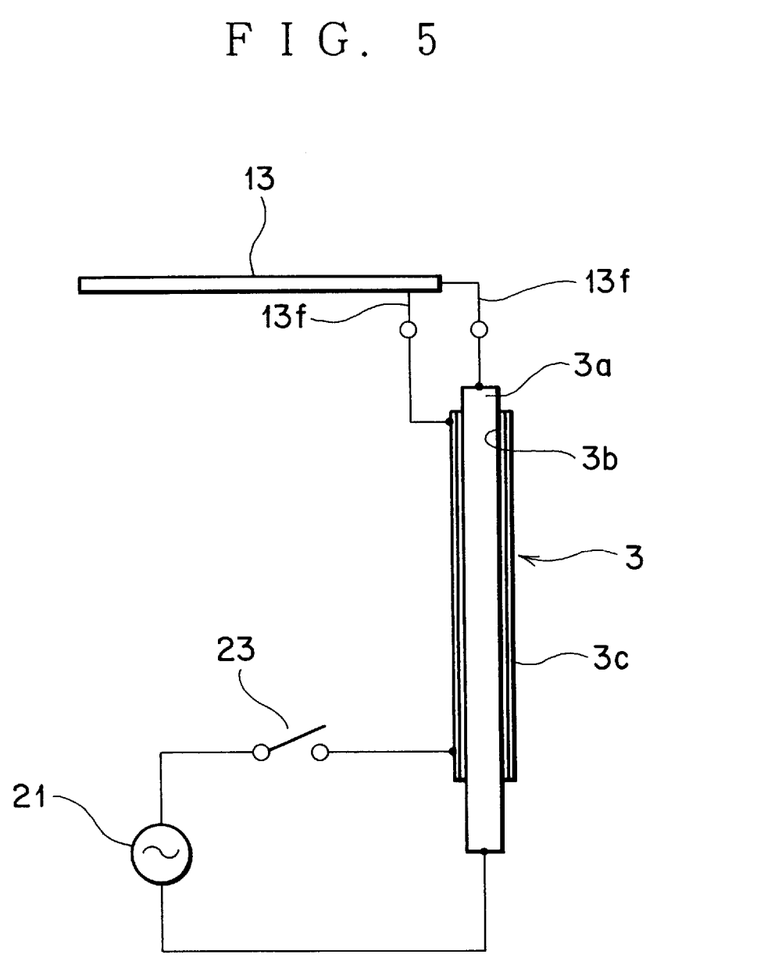
FIG. 5 is a schematic electric wiring diagram of an EL element shown in FIG. 1.

The leads 13f of both electrodes as mentioned above are each connected through the drive shaft 3 to an AC power supply 21, as schematically shown in the wiring diagram in FIG. 5.

More specifically, the drive shaft 3 comprises a central shaft 3a of conductive material, an annular insulating layer 3b formed around the outer periphery of the central shaft 3a, and a conductive layer 3c formed around the outer periphery of the insulating layer 3b. Each lead 13f is connected to one end of the respective central shaft 3a and conductive layer 3c, and the AC power supply 21 is connected through an ignition switch 23 to their other end.

The connection between the AC power supply 21 and the central shaft 3a and the connection between the ignition switch 23 and the conductive layer 3c may be made, for example, by utilizing a return spring for returning a pointer as disclosed in Japanese Utility Model Application Laid-Open Specification No. Hei 5-25317, a prior Japanese application by the present applicant.

The operation will now be described.

Figure 6:
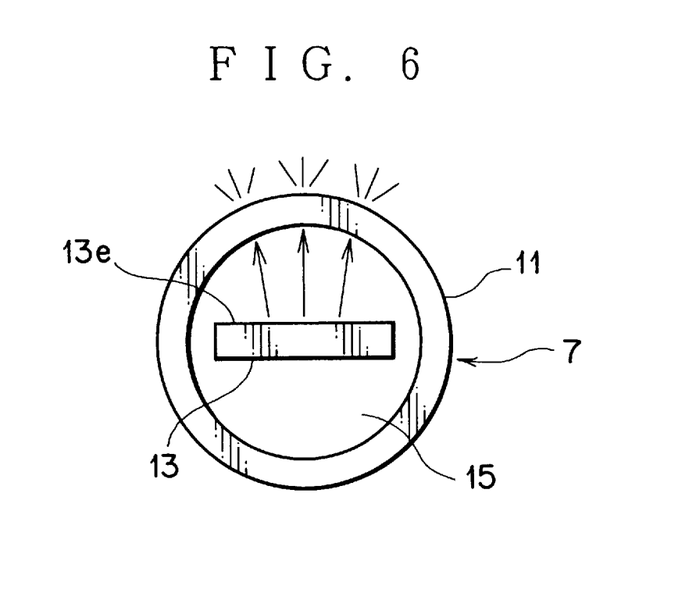
FIG. 6 is a side view of the indicating portion shown in FIG. 1.

On closing the ignition switch 23 through operation of an ignition key (not shown) or the like, a voltage from the AC power supply 21 is impressed between both electrodes 13a and 13d of the EL element 13 to excite the fluorescent substance of the fluorescent layer 13c and cause light to be emitted from the light-emitting surface 13e. This light passes through the indicating tube 11, while being diffused at the light-diffusing paint and emitted outwardly of the pointer 1 as illustrated in FIG. 6 to make the indicating portion 7 illuminated.

According to the pointer 1 of this embodiment having such construction, since the EL element 13 is of substantially the same length as the indicating tube 11 and since light is emitted with a uniform distribution over the entire light-emitting surface 13e of the EL element 13, the entire indicating portion 7 is illuminated with uniform brightness.

Since the indicating tube 11 is of cylindrical shape, as is the case with the indicating portion 81 in FIG. 12, the light passed through the indicating tube 11 allows the indicating portion 7 to be three-dimensionally viewed, thereby making an improvement in appearance, grade and fitness for practical use as compared with the pointer 67 in FIG. 11 which is flatly illuminated.

Further, since in this embodiment the EL element 13 is made up of flat layers laminatable by a common method such as printing, the cost for the part may be reduced as compared with the costly EL element 85 as in FIG. 13, which is made up of layers arcuately laminated around the outer periphery of the core 83 by calcination or the like. Thus, the pointer 1 may be obtained at low cost.

Figure 7:
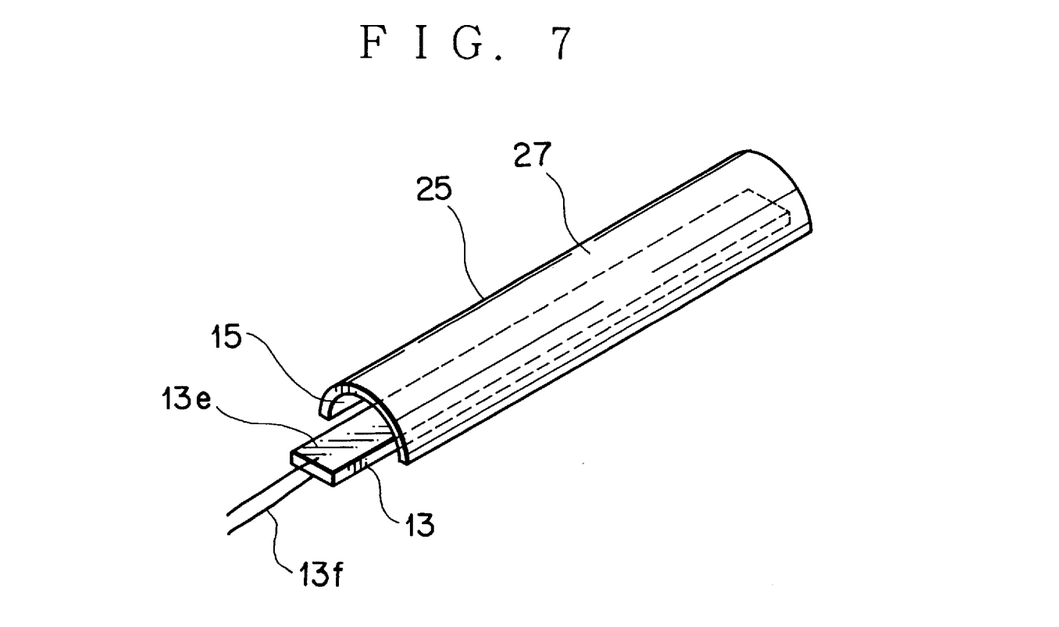
FIG. 7 is a perspective view of the indicating portion of a pointer for measuring instruments according to a second embodiment of this invention.

The indicating portion of a pointer according to a second embodiment of this invention will now be described with reference to FIG. 7, in which like parts or elements as in FIG. 1 are denoted by like reference characters and their description will be omitted.

The pointer 25 of the second embodiment differs from the pointer 1 of the first embodiment in that its indicating tube 11 is constructed by two resin forms 27, each having a half-cylindrical shape.

The pointer 25 of the second embodiment is formed as follows, using thermoplastic resin as the encapsulating material 15.

One of the resin forms 27 is placed on a flat table (not shown) in an upwardly convexed manner, with an EL element 13 placed on the table such that it lies on a curvature center axis of the one resin form. The encapsulating material 15 is then injected into the semi-column-like space defined between the table and the one resin form 27, and allowed to set.

Thereafter, the one resin form 27 is turned and placed on the table to be downwardly convexed, and the other of the resin forms 27 is placed in an upwardly convexed manner on the one resin form 27. Both resin forms 27 are assembled to each other to provide the indicating tube 11, which is circular in cross section.

Into the semi-column-like space defined between the encapsulating material 15 injected and set in the one resin form 27 and the other resin form 27 is injected the encapsulating material 15 and allowed to set to provide the indicating portion 7.

According to the pointer 25 of this embodiment, in addition to the same advantages as in the first embodiment, a further advantage is obtained that, at the time of the injection of the encapsulating material 15, the EL element 13 may be easily disposed on a substantial center axis of the indicating tube 11, without the use of jigs such as clamps 17 as in FIG. 3.

Figure 8:
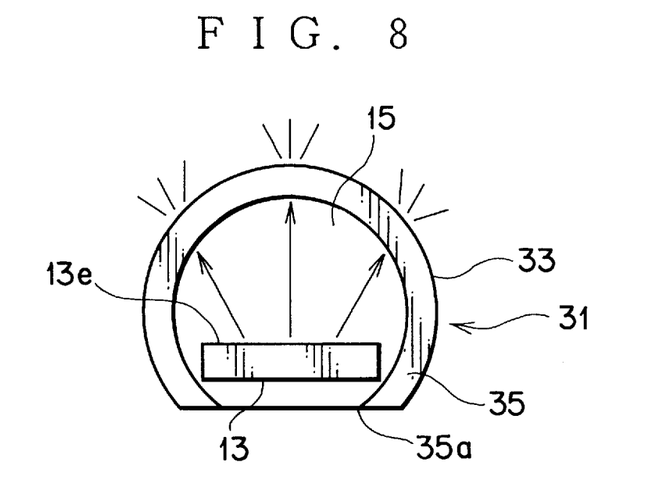
FIG. 8 is a side view of the indicating portion of a pointer for measuring instruments according to a third embodiment of this invention.

The indicating portion of a pointer according to a third embodiment of this invention will now be described with reference to FIG. 8, in which like parts or elements as in FIG. 6 are denoted by like reference characters and their description will be omitted.

The pointer 31 of the third embodiment differs from the pointer 1 of the first embodiment in the shape of the indicating tube 35 and the disposition of the EL element 13.

More specifically, the indicating tube 35 comprises a transparent synthetic-resin made cylindrical member a portion of which is longitudinally cut off. Desingated at 33 in FIG. 8 is an indicating portion, 35a the cut-off portion of the indicating tube 35.

Further, the EL element 13 is disposed at a position inside the indicating tube 35, a little displaced from the curvature center axis of the indicating tube 35 towards the cut-off portion 35a.

The thus constructed pointer 31 of the second embodiment realize the same advantages as in the first embodiment.

Further, an additional advantage is obtained that, since in the pointer 31 of this embodiment the position of the EL element 13 is a little displaced from the curvature center axis of the indicating tube 35 towards the cut-off portion 35a, the area of the indicating tube 35 where the light from the EL element 13 falls and passes, is enlarged circumferentially of the indicating tube 35. As a result, the area of the indicating tube 35 illuminated is widened, thereby enabling the indicating tube 35 to be three-dimensionally illuminated to a greater degree.

Further, since the cut-off portion 35a of the indicating tube 35 is located rearwardly of the EL element 13 where the light from the EL element 13 does not pass, the downsizing of the cross-sectional shape of the indicating tube 35 may be realized without making a reduction in the area of the indicating tube 35 illuminated.

Figure 9:
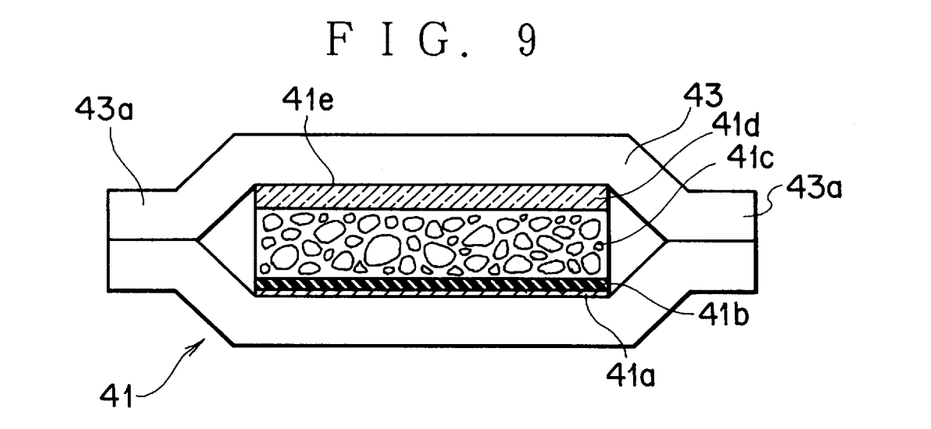
FIG. 9 is an explanatory view showing the EL element encapsulated by a protective film, which may be used as an light-emitting body for the pointers in the first to third embodiments.

In the first to third embodiments, in place of the above EL element 13, an EL element 41 as shown in FIG. 9 may be used, which comprises a laminate of a metal electrode 41a, an insulating layer 41b, a fluorescent layer 41c and a transparent electrode film 41d, and a light-transmitting protective film 43 sealing the laminate. In FIG. 9, designated at 41e is the light-emitting surface of the EL element 41, 43a sealing flaps formed at circumferential edges of the protective film 43.

It is to be noted, however, where the EL element 13 is used, since the protective film 43 is not provided, the light-emitting surface 13e may be made larger in area than the light-emitting surface 41e as much as the area of the sealing flaps 43a, leading to a greater amount of light emitted and better illumination of the indicating portion 1, 25 than with the EL element 41.

Further, in the case of the EL element 13, the encapsulating material 15 performs the function as of the protective film 43 in the EL element 41, rendering a special protective film unnecessary and leading to an advantage in the cost over the EL element 41.

While in the first and third embodiments, the EL element 13 is shown as held in the indicating tubes 11, 35 by means of the encapsulating material 15, it is also possible to employ a structure in which the encapsulating material 15 is not injected, but the EL element 13 is supported in the indicating tubes 11, 35 by means of a plurality of supports (not shown) protruding from an inner periphery of the indicating tubes 11, 35. In this case, the indicating tube 11, 35 alone constitutes the protection for the EL element 13.

The indicating portion of a pointer according to a fourth embodiment of this invention will now be described with reference to FIG. 10, in which like parts or elements as in FIG. 6 are denoted by like reference characters and their description will be omitted.

The pointer 51 of the fourth embodiment differs from the pointers 1, 25 of the first and second embodiments in the shape of the indicating tube 55 and the position of the EL element 13.

Figure 10:
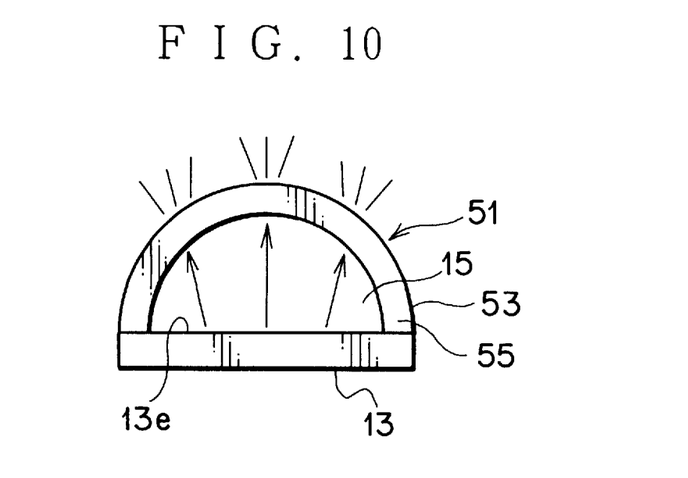
FIG. 10 is a side view of the indicating portion of a pointer for measuring instruments according to a fourth embodiment of this invention.

More specifically, the indicating tube 55 has a half-cylindrical shape, and its diametrical length substantially coincides with the width of the EL element 13 as shown in FIG. 10. The indicating tube 55 is at both lateral edge surfaces mounted on the light-emitting surface 13e of the EL element 13 at its lateral edge portions and fastened thereto with an adhesive or the like. Designated at 53 in FIG. 10 is the indicating portion.

The thus constructed pointer 51 of the fourth embodiment realizes the same advantages as in the first embodiment.

It is to be noted here that with the pointer 51 of the fourth embodiment, since circumferential edge surfaces of the EL element 13 are exposed to the outside, such an influence is expected as that moisture penetrates between neighboring layers of the EL element 13 so as to accelerate deterioration of the fluorescent substance or to cause electrolysis of the transparent electrode film 13d and an increase in the resistence of the film 13d until it is turned into an insulator.

Of these, as to the deterioration of the fluorescent substance, since in recent years there has been made an improvement in the technique for coating particles of fluorescent substance with moisture resistant films, the influence of the moisture may almost be neglected.

On the other hand, as to the turning of the transparent electrode film 13d into an insulator, some influences of the moisture are possible. In that case, for example opposite end surfaces in a widthwise direction of the EL element 13 are bonded to and closed by lateral inner surfaces adjacent the lateral opposite ends of the indicating tube 55.

It is needless to say that the constructions of the pointer according to this invention are not limited to those shown in the preceding embodiments, and various modifications may be made according to need.

For example, the material for the indicating tube 11, 35, 55 or the encapsulating material 15 may be replaced by material other than mentioned in the preceding first to fourth embodiments.

The above-described light-diffusing paint may be omitted, or may be coated not on the outer periphery but on the inner periphery of the indicating tube 11, 35, 55.

The indicating portion 7, 33, 53 may comprise the EL element 13, 41 and the encapsulating material 15, the indicating tube 11, 35, 55 being used only as a frame for the encapsulating material 15, which is removed after curing of the encapsulating material 15.

In this case, the light-diffusing paint is coated on the surface of the encapsulating material 15 after removal of the indicating tube 11, 35, 55. Protection for the EL element is provided only by the encapsulating material 15 after removal of the indicating tube 11.

The cap 9 (FIG. 1) may be omitted.

Further, while in each of the preceding embodiments, the light-emitting body is shown as comprising the EL element 13, 41, it is also possible to use as the light-emitting body a source of light other than the EL element 13, 41 so far as it is of such size as to be assembled into the indicating portion 7, 33, 53 and it has a light-emitting surface capable of emitting light in an uniformly distributed amount over its entire length at least in the longitudinal direction of the indicating portion 7, 33, 53.

Owing to the construction as mentioned hereinabove, according to this invention, such advantages as mentioned below are obtained. The pointer according to this invention is illuminated with entirely uniform brightness, as compared with the conventional pointer in which light is guided from the source of light to the pointer by way of the light-guiding plate. Further, according to this invention, a pointer of high practical use which is three-dimensionally illuminated without using a costly light-emitting body with a light-emitting surface of arcuate shape.

What is claimed is:

1. A pointer for measuring instruments comprising:
   a fixing portion mounted on a rotary drive shaft of a drive; and
   an indicating portion supported on said fixing portion and extending therefrom in a direction perpendicular to an axis of said rotary drive shaft, wherein said indicating portion comprises:
   a light-emitting body having a flat light-emitting surface extending over a substantially entire length of said indicating portion in said direction perpendicular to said axis of said rotary drive shaft, such that light, at said flat light-emitting surface, is substantially uniformly distributed at least in said direction perpendicular to said axis of said rotary drive shaft;
   a light-transmitting protective body covering at least said flat light-emitting surface, which includes a longitudinal portion of a hollow cylindrical tube ranging anywhere from one-half a circumference of said hollow cylindrical tube to an entire circumference of said hollow cylindrical tube, and an encapsulating material, said portion of said hollow cylindrical tube having, at a portion confronting at least said flat light-emitting surface, a surface arcuated in a circumferential direction of said direction perpendicular to said axis of said rotary drive shaft, said encapsulating material filling in a space between said portion of said hollow cylindrical tube and said light-emitting body to encapsulate said light-emitting body within said portion of said hollow cylindrical tube; and
   said light-emitting body, said longitudinal portion of said hollow cylindrical tube, and said encapsulating material being provided as separate components and integrally united as said indicating portion during production of said pointer.

2. The pointer according to claim 1, wherein said portion of said hollow cylindrical tube is said entire circumference of said hollow cylindrical tube.

3. The pointer according to claim 2, wherein said light-emitting body comprises an electroluminescence element, said electroluminescence element comprising a metal electrode, and an insulating layer, a fluorescent layer and a transparent electrode film laminated on said metal electrode in sequence, wherein said light-emitting surface is formed at a side of said transparent electrode film.

4. The pointer according to claim 1, wherein said portion of said hollow cylindrical tube is said one-half of a circumference of said hollow cylindrical tube.

5. The pointer according to claim 4, wherein said light-emitting body comprises an electroluminescence element, said electroluminescence element comprising a metal electrode, and an insulating layer, a fluorescent layer and a transparent electrode film laminated on said metal electrode in sequence, wherein said light-emitting surface is formed at a side of said transparent electrode film.

6. The pointer according to claim 1, wherein said portion of said hollow cylindrical tube is ¾th of said hollow cylindrical tube.

7. The pointer according to claim 6, wherein said light-emitting body comprises an electroluminescence element, said electroluminescence element comprising a metal electrode, and an insulating layer, a fluorescent layer and a transparent electrode film laminated on said metal electrode in sequence, wherein said light-emitting surface is formed at a side of said transparent electrode film.

8. The pointer according to claim 1, wherein said light-emitting body comprises an electroluminescence element, said electroluminescence element comprising a metal electrode, and an insulating layer, a fluorescent layer and a transparent electrode film laminated on said metal electrode in sequence, wherein said light-emitting surface is formed at a side of said transparent electrode film.

9. The pointer according to claim 1, further comprising a cap means for covering a top and sides of said fixing portion, wherein said cap means has a flat top surface and a cylindrical side wall with an opening through which said indicating portion radially projects so that a connection of said indicating portion to said fixing portion is protectively covered.

10. The pointer according to claim 1, wherein said rotary drive shaft is a solid tube of conductive material.

11. The pointer according to claim 10, wherein said solid tube of conductive material of said rotary drive shaft is covered with an insulating layer which is in turn covered with a conductive layer.

12. The pointer according to claim 11, further comprising leads from said light emitting body which are connected to said solid tube of conductive material of said rotary drive shaft and said conductive layer covering said rotary drive shaft at first ends of said rotary drive shaft and said conductive layer covering said rotary drive shaft, respectively.

13. The pointer according to claim 12, herein a second end of said rotary drive shaft is connected to a lead from an AC power source and a second end of said conductive layer covering said rotary drive shaft is connected to a lead from an ignition switch.

* * * * *